March 13, 1951

A. B. NEWTON 2,544,852

EXHAUST GAS TURBINE WITH VARIABLE NOZZLE
AREA FOR MAINTAINING CONSTANT PRESSURE
DROP THROUGH THE TURBINE

Filed Oct. 31, 1945

INVENTOR
ALWIN B. NEWTON

BY George N. Fisher
ATTORNEY

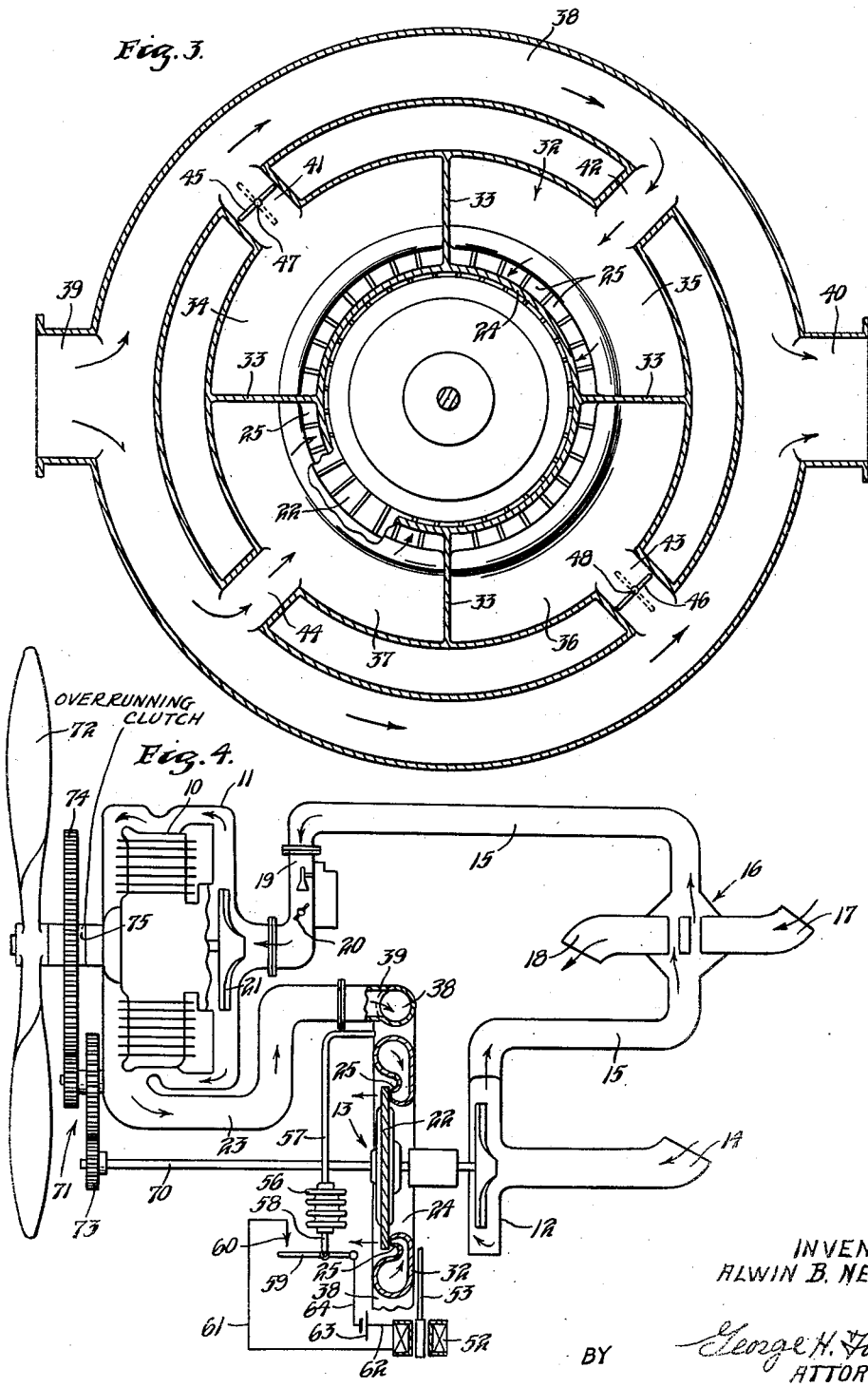

Patented Mar. 13, 1951

2,544,852

UNITED STATES PATENT OFFICE 2,544,852

EXHAUST GAS TURBINE WITH VARIABLE NOZZLE AREA FOR MAINTAINING CONSTANT PRESSURE DROP THROUGH THE TURBINE

Alwin B. Newton, Dayton, Ohio, assignor to Minneapolis-Honeywell Regulator Company, Minneapolis, Minn., a corporation of Delaware Application October 31, 1945, Serial No. 625,863

2 Claims. (Cl. 253—78)

This invention relates generally to improvements in turbines, particularly those actuated by exhaust gases from an engine supplied with supercharged air by a supercharger driven by said turbine.

The primary object of my invention is to provide improvements in such turbine elements, wherein the effective nozzle area is controlled in accordance with the amount of exhaust gases available from the engine for actuating the turbine, or in accordance with the differential between the pressure of such exhaust gases and the pressure of the atmosphere. In the attainment of this object, I provide means whereby the nozzle area may be reduced as the volume and pressure of the exhaust gases is diminished to thereby increase the pressure drop through the nozzles and increase the effective velocity of the gases delivered through these nozzles. I therefore make it possible to pick up the turbine speed from a low value when the engine is operating at low power, and thereby delivering a relatively small volume of exhaust gases, and greatly increase the rapidity with which the supercharging effect may be increased for accelerating the engine.

Another object is to provide an improved turbine structure wherein the exhaust gases are always admitted to the nozzles at diametrically opposed points with respect to the axis of rotation of the turbine wheel, so that the pressures thereon will, at all times, be balanced and bearing wear is reduced.

These and other objects of my invention will be made apparent in the course of the following specification, reference being had therein to the accompanying drawings, in which—

Figure 1 is a diagrammatical view showing an internal combustion engine and its complete induction system, to which air is supplied under pressure by a turbo-supercharger, wherein is embodied my present invention.

Figure 2 is a horizontal plan and sectional view taken substantially along the line 2—2 in Figure 1.

Figure 3 is an enlarged diametrical sectional view through the turbine and associated parts.

Figure 4 is a diagrammatical view showing my invention embodied in a turbine driven aircraft.

Figure 5 is a schematic view of a portion of a still further modification of my invention.

Referring now more particularly and by reference characters to the drawing, I have shown in Figure 1 thereof a conventional internal combustion engine 10, to the intake manifold 11 of which air for combustion is furnished by a supercharging compressor 12 powered by a turbine designated generally at 13. Air from the atmosphere is taken into the compressor 12 through an intake scoop 14 and is delivered under pressure therefrom through a duct 15 leading through an aftercooler unit 16, by which the heat of compression is largely removed from the compressed air. For this purpose, air from the atmosphere is taken into an after-cooler unit 16 through an intake 17, and after being passed in heat-exchanging relation with the air in duct 15, is discharged at 18. The air for compression after cooling is mixed with fuel in the carburetor 19 and is delivered to the intake manifold 11 under control of the conventional throttle 20. As here shown, there is also included a compressor 21 which is directly driven from the engine 10 and which, while increasing the compression of the fuel mixture, serves mainly to distribute the mixture evenly to all cylinders of the engine.

The turbine 13 conventionally includes a turbine wheel 22 connected, as indicated, to the compressor 12 to rotate the same, and this turbine wheel 22 is actuated by exhaust gases from the engine 10, which are led to the turbine through a duct 23. The turbine further includes a nozzle ring 24, having a plurality of nozzles 25 through which the exhaust gases are directed to impinge the buckets on the turbine wheel 22 and cause rotation thereof. For controlling the amount of such gases thus directed through the turbine nozzles, and for controlling the effective speed of the turbine wheel 22, there is provided a waste gate 26 located in an outlet 27. As is generally known, this waste gate 26 serves as it is closed to divert the majority of the exhaust gases through the turbine nozzles, and as it is opened permits a greater volume of the gases to escape directly through the outlet 27 without effect on the turbine. The position of waste gate 26 thus serves normally to precisely control the operating speed of the turbine, and the waste gate may be positioned in any suitable manner, such as by the electric motor 28 and linkage 29 herein shown. For controlling the motor 28, an amplifier and network 30 may be used, which runs the motor in opposite directions in accordance with changes in the pressure of the air in the duct 15 leading to carburetor 19, by means of a control device 31. The amplifier and network 30, motor 28, and control 31 can be arranged in the manner of any of well known motor control systems of the proportioning type.

Such a system applicable for use with the present apparatus is that shown in copending application of Hubert T. Sparrow, Serial No. 476,797, filed February 22, 1943, now Patent No. 2,477,663. Suffice it to say at this point, that the waste gate 26 is positioned at all times as required to maintain a selected pressure of the air supplied for combustion, even under widely varied conditions of atmospheric pressure.

In the ordinary turbine, the nozzle area is fixed and the velocity of the exhaust gases delivered through the nozzles to the turbine wheel depends on the volume of the gases available from the engine. During certain conditions it is found that the quantity of gases thus available is insufficient to produce a velocity through the nozzles which is higher than the required peripheral velocity of the turbine wheel. To the best of my knowledge, the velocity of the gases should be approximately twice the peripheral velocity of the wheel in order to obtain maximum turbine efficiency. In the particular installation here shown, closing movements of the waste gate 26 will, of course, increase the amount of gases delivered to the turbine to some extent, but particularly where the supercharger is in use upon an aircraft engine, it is found that there are times when the waste gate is almost or completely closed and yet the exhaust gases do not discharge through the turbine with sufficient velocity to accelerate its speed at the required rate. For example, if the aircraft is flying at high altitude and the engine is suddenly throttled down, there occurs a sharp drop in the quantity and pressure of the exhaust gases available for operating the turbine. To then accelerate the engine again as rapidly as may be required, is exceedingly difficult since the velocity of the exhaust gases may be insufficient to pick up the turbine wheel and increase the compressor speed at the rate required for providing the necessary increasing volume of air for combustion in the engine.

In accordance with my invention, I provide means whereby the effective nozzle area may be increased or decreased as may be required to properly accommodate and utilize the volume and pressure of the exhaust gases available for the turbine, as will now be described.

As best shown in Figure 3, the turbine is provided with a nozzle box or chamber 32 which surrounds and communicates with the turbine nozzle ring 24 and the nozzles 25 therein. The nozzle box is divided by radially extending partitions 33 into four separate chambers 34, 35, 36 and 37, which are isolated from each other by said partitions and each of which communicates with an equal number of the nozzles 25. For supplying exhaust gases to the nozzle box 32, I have shown for example, a surrounding annular manifold 38 which at diametrically opposed points has opening through its outer surface the inlet neck 39 and outlet neck 40 which are connected, respectively, to the exhaust gas duct 23 and to the duct carrying the waste gate 26 and leading to the outlet 27. The manifold 38, is, of course, hollow or tubular in form and is connected to the respective chambers 34, 35, 36 and 37 of the nozzle box 32 by four ducts 41, 42, 43 and 44 which extend radially inward from the manifold and communicate, as clearly shown, with the interior of the nozzle box. In a diametrically opposed pair of these conduits, for example, those numbered 41 and 43, I provide dampers or valves 45 and 46 disposed upon operating shafts 47 and 48, respectively, and arranged when closed, as they are shown in Figure 3, to close off communication between the manifold 38 and the diametrically opposed chambers 34 and 36 of the nozzle box 32.

In the operation of the structure as thus far described, it will be apparent that with the valves 45 and 46 opened, the exhaust gases from the duct 23 will be admitted in equal volumes to each of the nozzle chambers 34, 35, 36 and 37, and the sum of such volumes will be controlled by the position of waste gate 26 in the usual manner. Now, should the quantity of the exhaust gases available for actuating the turbine diminish, the valves 45 and 46 may be closed to isolate chambers 34 and 36 of the nozzle box from the manifold 38, and cause all of the exhaust gases available to be delivered equally between the remaining, diametrically opposed, chambers 35 and 37. The effective nozzle area is thus halved and as a result the exhaust back pressure is built up, increasing the pressure drop through the remaining open nozzles and the velocity of the gases delivered therethrough. As will be obvious, this action will increase the ratio of the velocity of the gases to the required peripheral velocity of the turbine wheel so that it may be accelerated as rapidly as required.

Inasmuch as the pressure drop through the turbine is a function of, or is determined by, the differential between the exhaust gas pressure being delivered to the turbine and the static atmosphere pressure, I utilize this pressure differential for controlling the position of the valves 45 and 46. As an example of control mechanisms for the valves, I have shown their shafts 47 and 48 as provided with arms 49 and 50, respectively, which are connected by a link 51, as seen in Figure 2. For swinging the arms 49 and 50, I have shown a solenoid 52 for actuating a plunger 53 which is connected by a link 54 to the arm 50. Energization of the solenoid 52 will move the plunger 53 axially in a downward direction as illustrated in Figure 2, swinging the arms 49 and 50, from their normal positions there indicated, in a clockwise direction and moving the valves 45 and 46 from their open positions to the closed positions indicated in full lines in Figure 3. The valves may be normally held open by means of a spring indicated at 55, or, on the alternative, another solenoid, not here shown, may be arranged to oppose solenoid 52 and selective energization of the solenoids will position the valves in either direction as will be clearly apparent. A stop 65 limits movement of the linkage by spring 55 with the valves open. For controlling the energization of solenoid 52, I show a bellows 56 which has its interior connected through a conduit 57 with the exhaust gas duct 23 so that the bellows is subjected interiorly to the pressure of the exhaust gases. Externally the bellows is exposed to the pressure of the atmosphere so that the expansion or contraction of the bellows measures or senses the differential between the exhaust gas pressure and the pressure of the atmosphere. It may here be noted that the bellows is preferably so located that it is subject only to static, and not to moving air pressures. The bellows is connected by an arm 58 to a swinging switch arm 59 which is adapted, upon contraction of the bellows, to make contact with a fixed switch contact 60. The contact 60 is connected through a conductor 61 to one terminal of the solenoid 52, the other terminal of which is connected to a conductor 62 to a suitable source of electrical energy, such as a battery designated at 63. The remaining terminal of battery 63 is connected by a conductor 64 to the switch arm 59.

In operation, the valves 45 and 46 are normally open so that the turbine operates in the conventional manner. Under such circumstances, so long as the pressure of the exhaust gases is sufficient to expand the bellows 56 and hold the switch arm 59 out of contact with fixed contact 60, the valves 45 and 46 will remain open. However, should the pressure of the exhaust gases diminish for any reason, the collapsing movement of the bellows 56 which will result due to such drop in pressure, will move arm 59 into electrical contact with fixed contact 60, closing the circuit to solenoid 52, which, upon energization, will move plunger 53 endwise in such manner as to swing the arms 58 and 59 in the proper direction for closing the valves 45 and 46. The effective nozzle area is thus reduced immediately as the differential between the exhaust gas pressure and atmospheric pressure falls below the point at which proper operation of the turbine would be maintained with all nozzles open. As soon, however, as the exhaust gas pressure is increased by the acceleration of the engine to a point adequate for normal turbine operation, the bellows 56 will be expanded again to open the electrical circuit to solenoid 52, and permit the spring 55 to reopen valves 45 and 46 restoring the gas flow to all nozzles of the turbine. While I have herein shown a minimum of four separate nozzle box chambers, it will be readily apparent that a greater number may be provided, and the admission of exhaust gases thereinto controlled selectively or sequentially to secure greater precision in the variation of the nozzle area.

Attention is called to the fact that the exhaust gases are admitted at all times to diametrically opposed groups of nozzles so that the load upon the turbine wheel 22 is balanced. Thus as all of the nozzles are in use, the load is distributed evenly around the entire periphery of the turbine wheel, whereas if nozzle box chambers 34 and 36 are cut out by closing valves 45 and 46, the gases are admitted to diametrically opposed peripheral portions of the wheel. Lateral strain and bearing wear upon the wheel and its shaft is thus held to a minimum and this is an important feature, particularly since the wheel drives at extremely high speed in operation.

In Figure 4 I have shown the invention as applied to a turbine driving an airplane propeller. Referring to this figure, in which like reference characters indicate elements the same as those of Figures 1 to 3, the turbine 13 in addition to driving the supercharger 12 drives shaft 70 which is connected through reduction gearing 71 to an airplane propeller 72. The reduction gearing 71 comprises a pinion gear 73 secured to the shaft 70 and a final gear 74 which is connected to the propeller shaft through an overrunning clutch 75. The purpose of the overrunning clutch is to permit the engine 10 to drive the propeller at a greater speed than that at which the turbine is tending to drive it under certain conditions.

The turbine 13 is provided with a series of nozzle boxes in the same manner as shown in Figures 2 and 3. Similarly, a switch 59, 60 actuated in accordance with the differential between exhaust gas and atmospheric pressure controls the energization of the solenoid 52 which in turn controls the number of nozzle boxes through which the exhaust gas passes. When the exhaust gas pressure is relatively low with respect to atmospheric pressure, only two of the nozzle boxes are employed and when it is relatively high all four nozzle boxes are employed.

The control arrangement for the turbine is not shown in Figure 4. The turbine may be controlled in any suitable way. For example, it may be controlled by the pressure of the air delivered by the compressor 12, as in Figure 1.

In Figure 5 I have illustrated a modification of my invention in which the value of the differential at which the number of nozzles is reduced from four to two is increased with decrease in altitude. In order to facilitate a comparison of Figures 2 and 5, similar reference characters have been used to designate similar parts. In the arrangement of Figure 5, the switch blade 59 is extended to provide a portion on the opposite side of the pivot point from the portion on which bellows 56 operates. Bearing against this upper extension is a bellows 80, the interior of which is evacuated and provided with a compression spring (not shown). The result of the evacuation of bellows 80 is that it is solely responsive to atmospheric pressure, the bellows expanding as the atmospheric pressure surrounding it decreases. Acting in opposition to differential responsive bellows 56 is a spring 82. The outer end of the spring 82 bears against a spring retainer 83 which is adjustably positioned by a screw 84 extending through a fixed support 85.

As will be recalled, the bellows 56 is responsive to the differential between exhaust gas pressure and atmospheric pressure, the exhaust gas acting on the interior of the bellows and the atmospheric pressure on the exterior of the bellows. The spring 82 may be adjusted so as to balance out the effect of bellows 80 at any desired altitude. Let it be assumed, for example, that the spring 82 is adjusted so that at sea level pressure the spring 82 and the bellows 80 exactly balance each other. Under these conditions, the apparatus functions in exactly the same manner as that of Figure 2, as long as the place is at sea level. Let it be assumed now that the aircraft is flying at a relatively high altitude. Under these conditions, the atmospheric pressure will be exerting less force on the exterior bellows 80 so that the effect of bellows 80 in tending to move the switch blade 59 in a counter-clockwise direction will be greater than that of the opposing effect of spring 82. Let it further be assumed that the elements are in the condition shown in Figure 5; that is, that the exhaust gas pressure differential, even when compensated by the effect of bellows 80, is sufficiently high to make it desirable for the gas to pass to all four nozzles of the aircraft. Now let it be assumed that the differential exhaust gas pressure and atmospheric pressure decreases for some reason or other, such as by the retarding of the throttle. Under these conditions, the switch blade 59 will tend to move to the right into engagement with contact 60. Due, however, to the action of bellows 80 which tends to maintain switch blade 59 out of engagement with contact 60, the engagement of switch blade 59 with contact 60 will occur at a lower differential pressure than would otherwise be the case. In other words, the turbine will continue to operate with four nozzles until a lower differential between exhaust gas and atmospheric pressure is attained. This is desirable since with a lower atmospheric pressure such as exists at the higher altitude, the density of the exhaust gas will be less. The effect of the less dense exhaust gas is to increase its speed through the turbine. Due to the increased speed of the exhaust gas for a given differential, it is possible to efficiently employ four nozzle boxes at a lower differential than would otherwise to the case.

As the aircraft descends so that the atmospheric pressure increases, the effect of the internal spring of bellows 80 is constantly decreased so that the value of the differential between exhaust gas and atmospheric pressures at which movement of switch blade 59 into engagement with contact 60 occurs continually increases. This is desirable since as the plane is descending, the density of the exhaust gas is increasing with a resultant reduction in velocity of the gas through the turbine. Hence, it is desirable to increase the value of the differential at which the effective number of nozzle boxes is decreased.

It is to be understood that the arrangement of Figure 5 can be used either with the species shown in Figures 1, 2, and 3 or with that shown in Figure 4. It is, however, particularly advantageous in connection with the arrangement of Figure 4.

It is understood that suitable modifications may be made in the structure as disclosed, provided such modifications come within the spirit and scope of the appended claims.

Having now therefore fully illustrated and described my invention, what I claim to be new and desire to protect by Letters Patent is:

1. An exhaust gas driven turbine for a turbo-supercharger, comprising a turbine wheel, a plurality of nozzles around the wheel for directing exhaust gases thereagainst, means for delivering exhaust gases to diametrically opposed portions of the nozzles, and separate means for selectively delivering the gases to other portions of the nozzles, said last mentioned means also delivering the gases to diametrically opposed portions of the nozzles to maintain balanced load conditions on the turbine wheel.

2. In combination with a turbine powered by exhaust gases from a combustion chamber in an aircraft, a nozzle assembly for delivering the exhaust gases to the turbine wheel, means for varying the effective area of the nozzles to which such gases are delivered, means responsive to the differential between exhaust gas pressure and the atmospheric pressure effective when said differential drops below a predetermined value to cause said nozzle varying means to reduce the nozzle area, and means responsive to atmospheric pressure for decreasing said predetermined value of differential as said atmospheric pressure decreases.

ALWIN B. NEWTON.

REFERENCES CITED

The following references are of record in the file of this patent:

UNITED STATES PATENTS

| Number | Name | Date |
|---|---|---|
| 933,906 | Illy | Sept. 14, 1909 |
| 1,816,737 | Moss | July 28, 1931 |
| 1,816,787 | Moss | July 28, 1931 |
| 2,283,175 | Berger | May 19, 1942 |
| 2,359,615 | Browne et al. | Oct. 3, 1944 |
| 2,376,199 | Shoults | May 15, 1945 |
| 2,386,096 | Ehrling | Oct. 2, 1945 |
| 2,405,413 | Edwards | Aug. 6, 1946 |

FOREIGN PATENTS

| Number | Country | Date |
|---|---|---|
| 206,845 | Great Britain | Feb. 21, 1924 |
| 479,278 | Great Britain | Jan. 28, 1938 |
| 374,609 | Italy | Sept. 2, 1939 |